United States Patent
Oberg et al.

(10) Patent No.: US 9,123,369 B2
(45) Date of Patent: Sep. 1, 2015

(54) METHOD AND APPARATUS FOR DETERMINING POSITION OF MULTIPLE DRIVE HEADS

(71) Applicant: Marvell World Trade Ltd., St. Michael (BB)

(72) Inventors: Mats Oberg, San Jose, CA (US); Qiyue Zou, San Jose, CA (US); Gregory Burd, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/482,124

(22) Filed: Sep. 10, 2014

(65) Prior Publication Data

US 2015/0092296 A1 Apr. 2, 2015

Related U.S. Application Data

(60) Provisional application No. 61/884,536, filed on Sep. 30, 2013.

(51) Int. Cl.
| | |
|---|---|
| *G11B 21/02* | (2006.01) |
| *G11B 5/596* | (2006.01) |
| *G11B 5/48* | (2006.01) |
| *G11B 5/55* | (2006.01) |

(52) U.S. Cl.
CPC .......... *G11B 5/59627* (2013.01); *G11B 5/4886* (2013.01); *G11B 5/553* (2013.01); *G11B 5/59683* (2013.01)

(58) Field of Classification Search
None
See application file for complete search history.

(56) References Cited

U.S. PATENT DOCUMENTS

| | | | | |
|---|---|---|---|---|
| 4,575,775 | A | * | 3/1986 | Albrecht .................... 360/77.08 |
| 5,245,487 | A | * | 9/1993 | Cunningham ............. 360/77.01 |
| 5,436,773 | A | * | 7/1995 | Hanson ........................... 360/66 |
| 6,104,562 | A |   | 8/2000 | Ottesen et al. |
| 6,154,335 | A |   | 11/2000 | Smith et al. |
| 7,233,453 | B2 | * | 6/2007 | Harada et al. .................... 360/51 |
| 8,139,301 | B1 | * | 3/2012 | Li et al. ........................... 360/39 |
| 8,891,207 | B1 | * | 11/2014 | Li et al. ......................... 360/316 |
| 2003/0007276 | A1 |   | 1/2003 | Satoh |
| 2007/0201160 | A1 | * | 8/2007 | Albrecht et al. ................ 360/75 |
| 2009/0040643 | A1 |   | 2/2009 | Weng et al. |

* cited by examiner

*Primary Examiner* — Tan X Dinh

(57) ABSTRACT

Determining the radial position of a first read head of a storage device includes reading servo data from a storage media platter surface using the first read head, deriving from that servo data a first positron error signal representing a first estimate of the radial position of the first read head, reading the servo data from the storage media platter surface using a different read head, deriving from that servo data a second position error signal representing an estimate of the radial position of the different read head, and combining the first estimate of the radial position of the first read head and the estimate of the radial position of the different read head to obtain a revised estimate of the radial position of the first read head. The combining could include taking account of a known positional offset between the first read head and the different read head.

20 Claims, 5 Drawing Sheets

METHOD AND APPARATUS FOR DETERMINING POSITION OF MULTIPLE DRIVE HEADS

CROSS REFERENCE TO RELATED APPLICATION

This claims the benefit of copending, commonly-assigned U.S. Provisional Patent Application No. 61/884,536; filed Sep. 30, 2013, which is hereby incorporated by reference herein in its entirety.

FIELD OF USE

This disclosure relates to data storage systems of the type in which read and write heads move over the surface of a storage medium. More particularly, this disclosure relates to determining the position of two read heads that are used with a single disk surface.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation.

As areal densities for magnetic data storage continue to increase, with tracks written in an overlapping or "shingled" fashion, one technique that is under consideration is using two or more read sensors on each head assembly instead of one sensor as is currently used. This is sometimes referred to as "two-dimensional magnetic recording" (TDMR). But as track densities increase, and track pitch decreases, it becomes more difficult for disk drive servo control loop to keep the drive heads on track.

SUMMARY

According to one implementation, a method of determining radial position of a first read head of a storage device, where the first read head is one of at least two read heads carried by a common actuator relative to a storage media, platter surface of the storage device, there being a known positional offset between the first read head and each other one of the at least two read heads, includes reading servo data from the storage media platter surface using the first read head, deriving, from the servo data read from the storage media platter surface using the first read head, a first positron error signal representing a first estimate of the radial position of the first read head, reading the servo data from the storage media platter surface using a different one of the at least two read heads, deriving, from the servo data read from the storage media platter surface using the different one of the at least two read heads, a second position error signal representing an estimate of the radial position of the different one of the at least two read heads, and combining the first estimate of the radial position of the first read head and the estimate of the radial position of the different one of the at least two read heads to obtain a revised estimate of the radial position of the first read head.

In a variant of that implementation, the combining includes taking account of the known positional offset between the first read head and the different one of the at least two read heads.

Another variant of that implementation also includes temporally aligning the first position error signal and the second position error signal.

According to another implementation, apparatus that determines radial position of a first read head of a storage device, where the first read head is one of at least two read heads carried by a common actuator relative to a storage media platter surface of the storage device, there being a known positional offset between the first read head and each other one of the at least two read heads, includes a first position error detector that derives, from the servo data read from the storage media platter surface using the first read head, a first position error signal representing a first estimate of the radial position of the first read head, a second position error detector that derives, from the servo data read from the storage media platter surface using the different one of the at least two read heads, a second position error signal representing an estimate of the radial position of the different one of the at least two read heads, and a position error signal combiner that combines the first estimate of the radial position of the first read head and the estimate of the radial position of the different one of the at least two read heads to obtain a revised estimate of the radial position of the first read head.

In a variant of that implementation, an input to the positron error signal combiner is the known positional offset between the first read head and the different one of the at least two read heads.

Another variant of that implementation also includes circuitry to temporally align the first position error signal and the second position error signal.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, in two-dimensional magnetic recording, there may be two (or more) read heads or sensors per disk surface. And in such a form of recording, with very high track densities, it can be expected that the head width will exceed the track width. Thus, each read sensor may pick up at least portions of two or more adjacent tracks. This can be used for improved head position "servo" control.

Because each read sensor may pick up at least portions of two or more adjacent tracks, that means that for each track, there will be at least two servo channels. Each servo channel provides a position error signal (PES) for its respective head or sensor. However, there is a known relationship, or offset, between the positions of the different sensors on the head assembly. Therefore, the position error signals for the different sensors can be combined to obtain an improved PES for each sensor, as described below.

Figure 1:
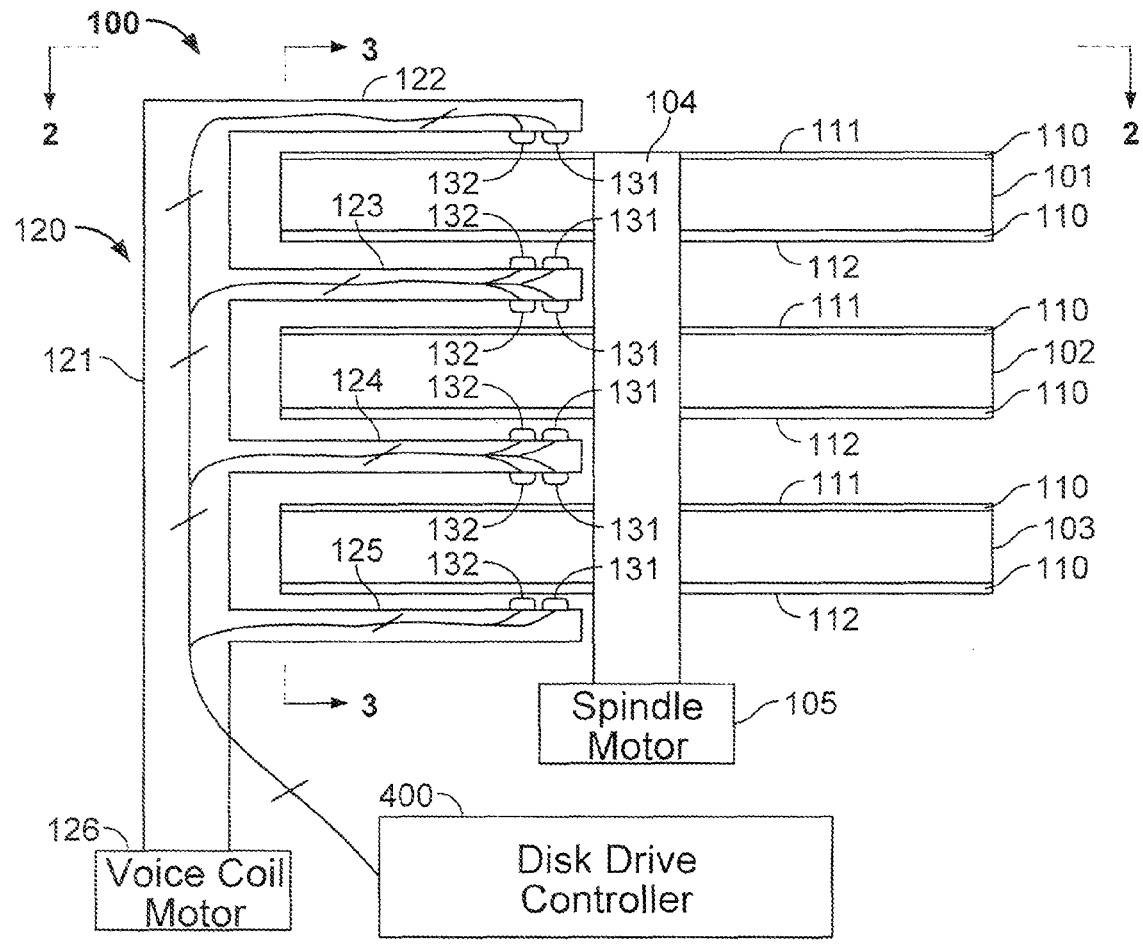
FIG. 1 is a side elevational view of a portion of a disk drive with which the present disclosure may be used.
Figure 2:
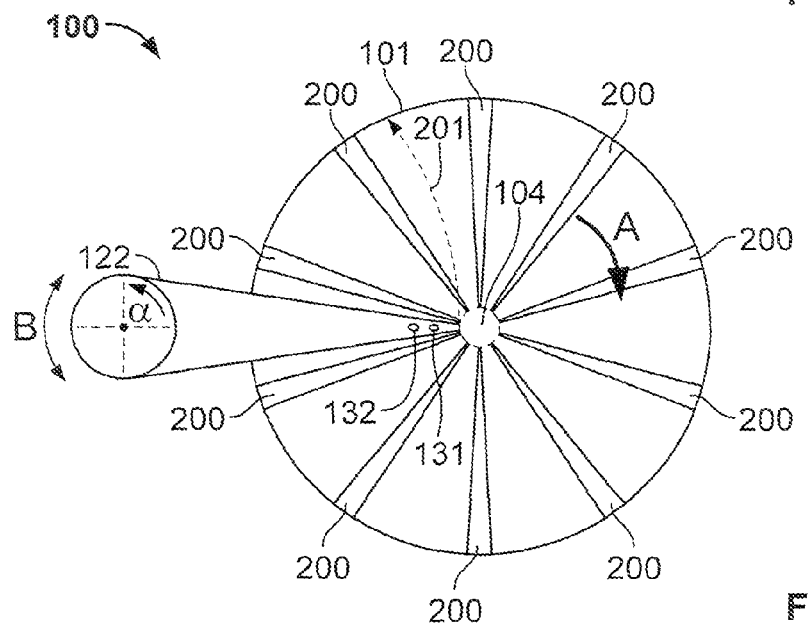
FIG. 2 is a plan view of the disk drive portion of FIG. 1, taken from line 2-2 of FIG. 1.

FIGS. 1 and 2 show an example of a disk drive 100 with which the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided, platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger by comparison to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104.

Figure 4:
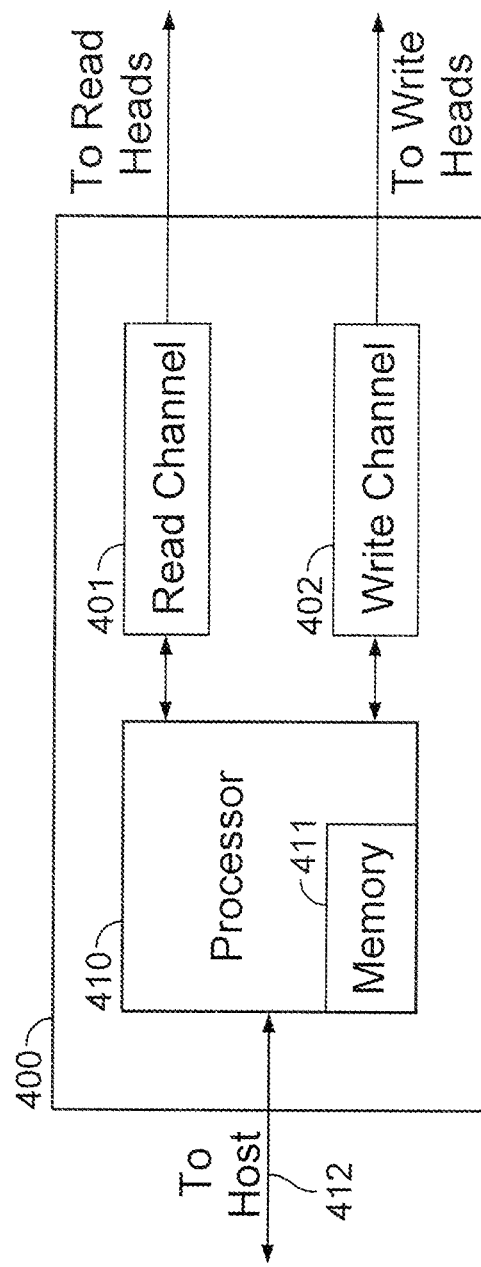
FIG. 4 is a schematic representation of a controller for the drive of FIGS. 1 and 2.

Each of read heads 131, 132 is connected to a read channel 401 of a hard drive controller 400 (there is a corresponding write channel 402) (FIG. 4). Hard drive controller 400 also includes a processor 410 and memory 411, as well as a connection 412 to a host processor (not shown). Memory 411 may be used as discussed, above to store the PES data that indicates the track position offsets. A servo control loop in hard drive controller 400 uses the PES data to keep the heads 131, 132 on track.

Conventionally, there is one PES signal corresponding to each head. As noted above, as track densities become higher and track pitch becomes smaller, it becomes more difficult for disk drive servo control loop to keep the drive heads 131, 132 on track. However, implementations of this disclosure improve servo control by providing more accurate servo data, as shown in connection with FIG. 3.

Figure 3:
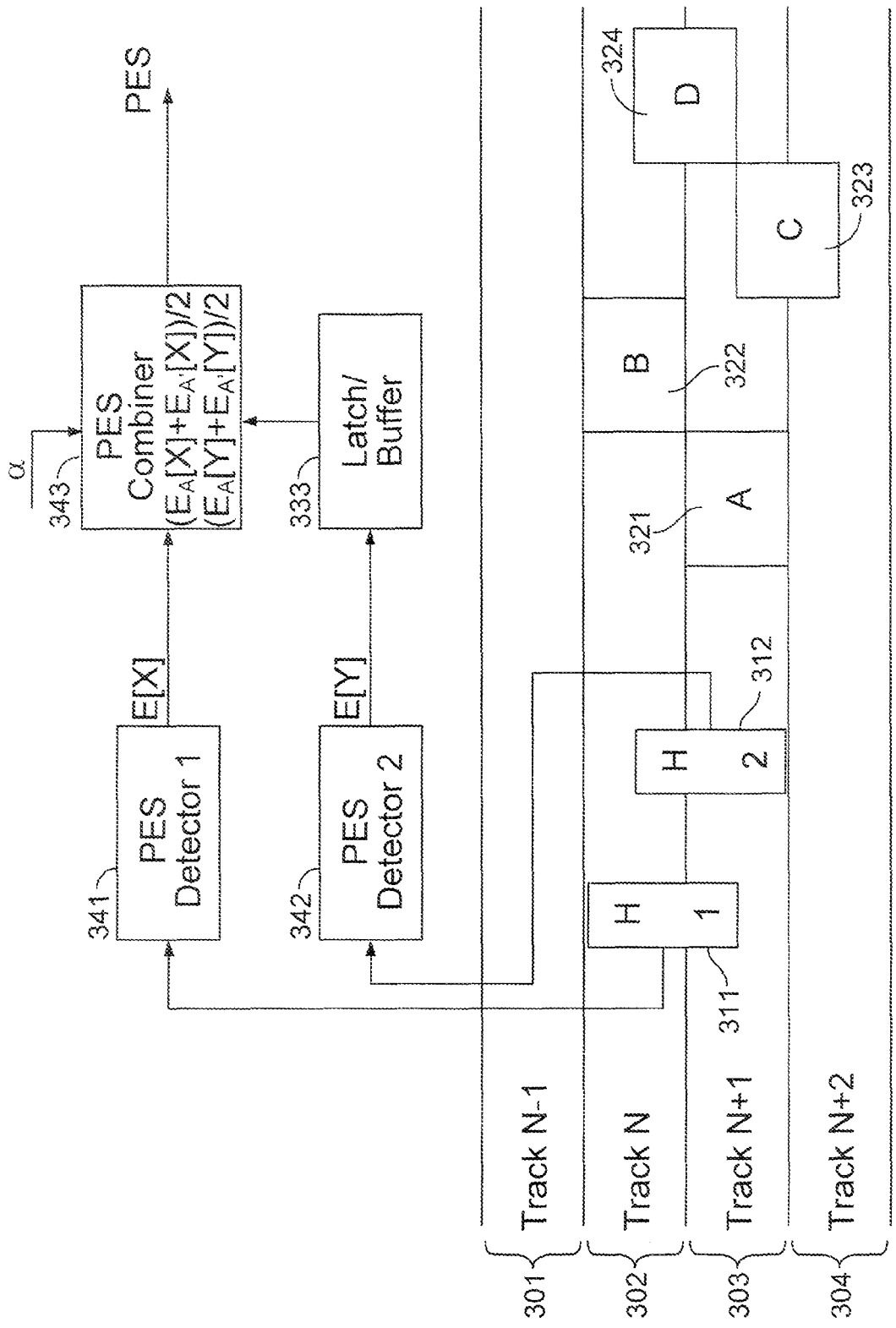
FIG. 3 is a schematic representation of an implementation of apparatus according to this disclosure.

FIG. 3 schematically shows tour tracks N−1 (301), N (302), N+1 (303) and N+2 (304). Although drawn as being straight, in reality, tracks 301-304 would typically be curved. Two read, heads or sensors H1 (311) and H2 (312) may be mounted on a common actuator. As shown, heads 311, 312 are positioned over tracks N (302) and N+1 (303) (although they could, be positioned over any two adjacent tracks). Servo wedges or bursts A (321), B (322), C (323) and B (324) are provided to allow head position detection and servo control.

Each servo wedge or burst 321-24 provides an estimate for each of the two sensors 311, 312 that pass over it. However, two sensors 311, 312 are mounted on a common actuator, so the offset between the relative positions of the two sensors 311, 312 is known. Therefore, the servo data from the two sensors 311, 312 can be used to provide improved position estimates for each sensor 311, 312.

For example, if the position of sensor H1 (311) is designated "X", the position of sensor H2 (312) is designated "Y", and the radial offset, between the two sensors 311, 312 is designated "Z", than X−Z=Y (assuming that sensor H1 (311) is the sensor further from the center of the disk). Thus, as sensor H2 (312) passes over burst A (sensor H2 (312) will get to wedge A first as the disk rotates), PES Detector 2 (342) will generate an estimate of position Y of sensor H2 (312), which estimate may be designated $E_A[Y]$. Shortly thereafter, as sensor H1 (311) passes over burst A, PES Detector 1 (341) will generate an estimate of position X of sensor H1 (311), which estimate may be designated $E_A[X]$. The same would occur with respect to wedges B, C and D, to generate estimates $E_B[X]$, $E_B[Y]$, $E_C[X]$, $E_C[Y]$, $E_D[X]$ and $E_D[Y]$.

PES combiner 343 can use those two estimates to obtain an improved estimate of the position of either sensor 311, 312. For example, if the position of sensor H1 (311) is the position of interest, as noted above, X−Z=Y, or X=Y+Z. Therefore, PES combiner 343 can use $E_A[Y]+Z$ as an alternate estimate $E_A'[X]$ of the position of sensor H1 (311). The two estimates $E_A[X]$ and $E_A'[X]$ can be combined in a predetermined way to yield an improved estimate of X. For example, a simple average may be used, so that $X=(E_A[X]+E_A'[X])/2$. A more complicated combination, which takes into account, for example, the degree to which the sensor of interest overlaps the track to which the servo burst belongs and/or the quality of each sensor, may also be used.

It will be appreciated that if sensor H2 (312) is the sensor of interest, then PES combiner 343 can use $E_A[X]-Z$ as an alternate estimate $E_A'[Y]$ of the position of sensor H2 (312), to derive $Y=(E_A[Y]+E_A'[Y])/2$ (or a more complicated combination). It will also be appreciated that for either sensor H1, H2 (311, 312), estimated positions can be similarly derived from each of servo bursts B, C, D.

The radial offset Z actually is not a constant. Instead, it varies as the actuator angle varies. Therefore, the actuator angle α also is input to PES combiner 343 so that PES combiner 343 can compute $Z(\alpha)$.

As noted above, sensor H2 (312) will get to a particular servo burst before sensor H1 (311) as a result of the rotation of the disk. Therefore, ideally, for the estimate of the position of one sensor to be most meaningful as an estimate of the position of the other sensor, the time difference required for sensor H1 (311) to reach the particular servo burst after sensor H2 (312) had already reached that particular servo burst, must be taken into account. Otherwise, when PES combiner 343 is combining the output of PES detectors 341, 342, the contribution from PES detector 342 may already reflect the next servo PES burst.

Therefore, a latch or buffer 333 may be provided to store the output of PES detector 342 until PES detector 341 reflects the output of sensor H1 (311) from the correct servo PES burst. Latch or buffer 333 may actually represent multiple latches or buffers, because if the various wedges A, B, C, D are close enough together, sensor H2 (312) may pass more than one additional burst before sensor H1 (311) reaches the first PES burst.

Figure 5:
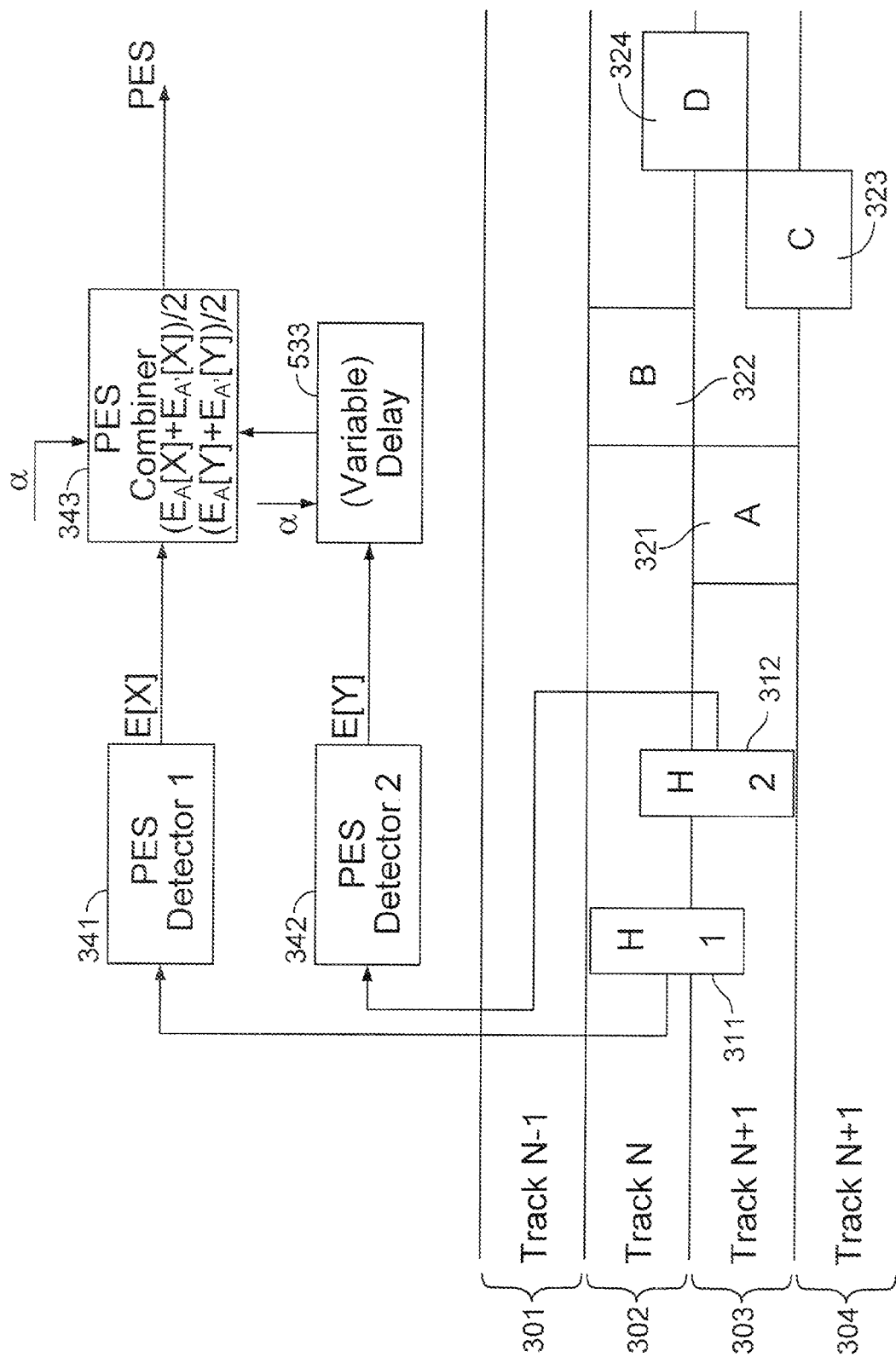
FIG. 5 is a schematic representation of an alternate implementation of apparatus according to this disclosure.

Alternatively, in a system in which the PES bursts A, B, C, D are far enough apart, latch or buffer 333 may be replaced by a delay 533 (FIG. 5). In such a system, delay 533 may be variable, because the tangential distance between sensors H1, H2 (311, 312) varies as the actuator angle varies, just as Z varies. Therefore, actuator angle a may be used to control variable delay 533.

Implementations of this disclosure thereby use the same narrow track width and/or high track density that give rise to the need for better head servo control to provide that better control by relying on the fact that each head may detect servo wedge data so that multiple estimates may be derived for each track and then combined.

Figure 6:
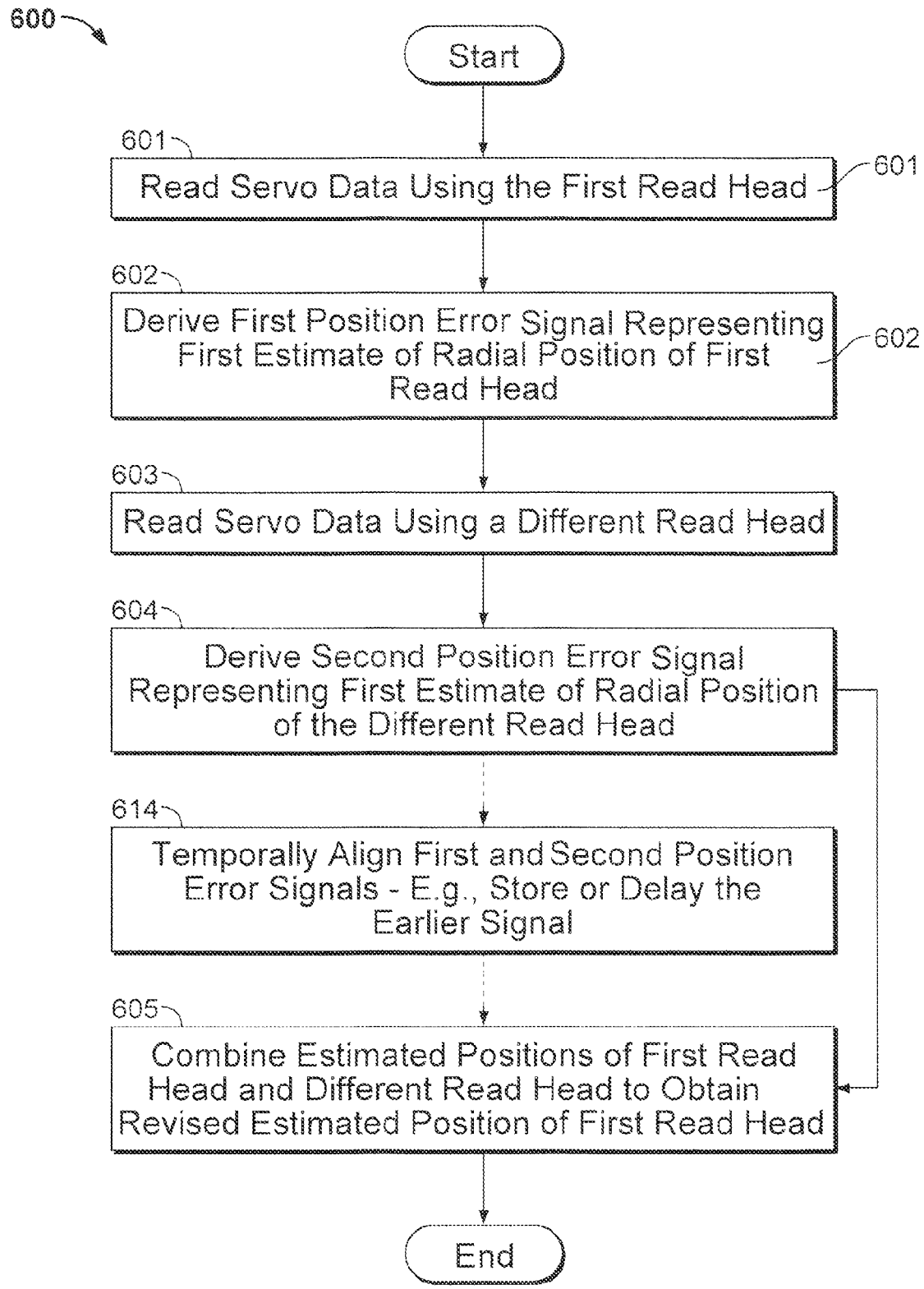
FIG. 6 is a flow diagram of an implementation of a method according to this disclosure.

One example of a method 600 according to such an implementation is diagrammed in FIG. 6. Method 600 is a method for determining the radial position of a first read head of a storage device. At 601, servo data from the storage media platter surface are read using the first read head. At 602, a first position error signal representing a first estimate of the radial position of the first read head is derived from the servo data read from the storage media platter surface using the first read head. At 603, servo data from the storage media platter surface are read using a different one of the at least two read heads. At 604, a second position error signal representing an estimate of the radial position of the different one of the at least two read heads is derived from the servo data read from the storage media platter surface using the different one of the at least two read heads.

At 605, the estimate of the radial position of the first read head and the estimate of the radial position of the different one of the at least two read heads are combined to obtain a revised estimate of the radial position of the first read head. As previously noted, the combining takes account of the known positional offset between the first read head and the different one of the at least two read heads. The known positional offset varies as a function of actuator rotation angle, and taking account of the known positional offset may include deriving a radial offset component from the known positional offset and the actuator rotation angle.

The combining may include using the estimate of the radial position of the different one of the at least two read heads and the known positional offset between the first read head and the different one of the at least two read heads to obtain a second estimate of the radial position of the first read head, and using the first and second estimates of the radial position of the first read head to obtain the revised estimate of the radial position of the first read head. This could be done by adding or subtracting, as may be appropriate, the radial position of the different one of the at least two read heads and the known positional offset between the first read head and the different one of the at least two read heads to obtain a second estimate of the radial position of the first read head, and then averaging the first and second estimates of the radial position of the first read head.

Method 600 also may optionally include, at 614, temporally aligning the first position error signal and the second position error signal. Temporal alignment may be performed by storing whichever of the first position error signal and the second position error signal is available earlier until whichever of the first position error signal and the second position error signal is available letter becomes available, or by delaying whichever of the first position error signal and the second position error signal is available earlier until whichever of the first position error signal and the second position error signal is available later becomes available. The delay may be derived by determining a circumferential offset from the known positional offset and the actuator rotation angle and calculating how long it takes for the disk rotation to cover that circumferential offset.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of determining radial position of a first read head of a storage device, where the first read head is one of at least two read heads carried by a common actuator relative to a storage media platter surface of the storage device, there being a known positional offset between the first read head and each other one of the at least two read heads, the method comprising:
   reading servo data from the storage media platter surface using the first read head;
   deriving, from the servo data read from the storage media platter surface using the first read head, a first position error signal representing a first estimate of the radial position of the first read head;
   reading the servo data from the storage media platter surface using a different one of the at least two read heads;

deriving, from the servo data read from the storage media platter surface using the different one of the at least two read heads, a second position error signal representing an estimate of the radial position of the different one of the at least two read heads; and combining the first estimate of the radial position of the first read head and the estimate of the radial position of the different one of the at least two read heads to obtain a revised estimate of the radial position of the first read head.

2. The method of claim 1 wherein the combining comprises taking account of the known positional offset between the first read head and the different one of the at least two read heads.

3. The method of claim 2 wherein:
the known positional, offset varies as a function of actuator rotation angle; and
the taking account comprises deriving a radial offset component from the known positional offset and the actuator rotation angle.

4. The method, of claim 2 wherein the combining comprises:
using the estimate of the radial position of the different one of the at least two read heads and the known positional offset between the first read head and the different one of the at least two read heads to obtain a second estimate of the radial position of the first read head; and
using the first and second estimates of the radial position of the first read head to obtain the revised estimate of the radial position of the first read head.

5. The method of claim 4 wherein using the estimate of the radial position of the different one of the at least two read heads and the known positional offset between the first read head and the different one of the at least two read heads to obtain a second estimate of the radial position of the first read head comprises adding/subtracting the radial position of the different one of the at least two read heads and the known positional offset between the first read head and the different one of the at least two read heads to obtain a second estimate of the radial position of the first read head.

6. The method of claim 4 wherein using the first and second estimates of the radial position of the first read head to obtain the revised estimate of the radial position of the first read head comprises averaging the first and second estimates of the radial position of the first read head.

7. The method of claim 1 further comprising temporally aligning the first position error signal and the second position error signal.

8. The method of claim 7 wherein temporally aligning the first position error signal and the second position error signal comprises storing whichever of the first position error signal and the second position error signal is available earlier until whichever of the first position error signal and the second position error signal is available later becomes available.

9. The method of claim 7 wherein temporally aligning the first position error signal and the second position error signal comprises delaying whichever of the first position error signal and the second position error signal is available earlier until whichever of the first position error signal and the second position error signal is available later becomes available.

10. The method of claim 9 wherein:
the known positional offset varies as a function of actuator rotation angle; and
the delaying is derived by determining a circumferential offset from the known positional offset and the actuator rotation angle.

11. Apparatus that determines radial position of a first read head of a storage device, where the first read head is one of at least two read heads carried by a common actuator relative to a storage media platter surface of the storage device, there being a known positional offset between the first read head and each other one of the at least two read heads, the apparatus comprising:
a first position error detector that derives, from the servo data read from the storage media platter surface using the first read head, a first position error signal representing a first estimate of the radial position of the first read head;
a second position error detector that derives, from the servo data read from the storage media platter surface using the different one of the at least two read heads, a second position error signal representing an estimate of the radial position of the different one of the at least two read heads; and
a position error signal combiner that combines the first estimate of the radial position of the first read head and the estimate of the radial position of the different one of the at least two read heads to obtain a revised estimate of the radial position of the first read head.

12. The apparatus of claim 11 wherein an input to the position error signal combiner is the known positional offset between the first read head and the different one of the at least two read heads.

13. The apparatus of claim 12 wherein:
the known positional offset varies as a function of actuator rotation angle; and
the position error signal combiner derives a radial offset component from the known positional offset and the actuator rotation angle.

14. The apparatus of claim 12 wherein the position error signal combiner:
uses the estimate of the radial position of the different one of the at least two read heads and the known positional offset between the first read head and the different one of the at least two read heads to obtain a second estimate of the radial position of the first read head; and
uses the first and second estimates of the radial position of the first read head to obtain the revised estimate of the radial position of the first read head.

15. The apparatus of claim 14 wherein the position error signal combiner comprises addition/subtraction circuitry to add/subtract the radial position of the different one of the at least two read heads and. the known positional offset between the first read head and the different one of the at least two read heads to obtain a second estimate of the radial position of the first read head.

16. The apparatus of claim 14 wherein the position error signal combiner comprises addition circuitry and divide-by-two circuitry to average the first and second estimates of the radial position of the first read head.

17. The apparatus of claim 11 further comprising circuitry to temporally align the first position error signal and the second position error signal.

18. The apparatus of claim 17 wherein the circuitry to temporally align the first position error signal and the second position error signal comprises a buffer that stores whichever of the first position error signal and the second position error signal is available earlier until whichever of the first position error signal and the second position error signal is available later becomes available.

19. The apparatus of claim 17 wherein the circuitry to temporally align the first position error signal and the second position error signal comprises delay circuitry.

20. The apparatus of claim 19 wherein:
the actuator has a variable rotation angle which determines a variable circumferential component of the known positional offset; and
the delay circuitry is adjustable as a function of the variable rotation angle to account for delay resulting from the circumferential component of the known positional offset.

* * * * *